United States Patent [19]

Hara et al.

[11] Patent Number: 4,763,996
[45] Date of Patent: * Aug. 16, 1988

[54] SPATIAL LIGHT MODULATOR

[75] Inventors: Tsutomu Hara; Yoshiharu Ooi; Kazunori Shinoda; Koji Ichie, all of Hamamatsu, Japan

[73] Assignee: Hamamatsu Photonics Kabushiki Kaisha, Hamamatsu, Japan

[*] Notice: The portion of the term of this patent subsequent to Jul. 7, 2004 has been disclaimed.

[21] Appl. No.: 798,932

[22] Filed: Nov. 18, 1985

[30] Foreign Application Priority Data

| Nov. 20, 1984 [JP] | Japan | 59-244754 |
| Dec. 28, 1984 [JP] | Japan | 59-278943 |
| Dec. 28, 1984 [JP] | Japan | 59-278944 |
| Apr. 26, 1985 [JP] | Japan | 60-90621 |

[51] Int. Cl.⁴ ............................................. G02F 1/03
[52] U.S. Cl. ................................. 350/387; 350/393; 350/405
[58] Field of Search ............... 350/356, 387, 392–393, 350/405

[56] References Cited

U.S. PATENT DOCUMENTS

| 2,024,737 | 12/1935 | Klingsporn | 350/387 |
| 3,374,473 | 3/1968 | Cummins | 350/389 |
| 3,499,157 | 3/1970 | Satake et al. | 350/393 |
| 3,520,589 | 7/1970 | Angel et al. | 350/393 |
| 3,626,317 | 12/1971 | Dakss et al. | 350/392 |
| 3,702,215 | 11/1972 | Cummins | 350/393 |
| 4,094,581 | 6/1978 | Baldwin et al. | 350/387 |
| 4,678,286 | 7/1987 | Hara | 350/393 |

FOREIGN PATENT DOCUMENTS 1758633 12/1971 United Kingdom ............... 350/389

OTHER PUBLICATIONS

Lindberg, E., "Solid Crystal Modulates Light Beams", Electronics, 12-20-63, pp. 58–61.
Moore et al, "Design of an Electrooptic Light Valve Projection Display", IEEE Trans. on Electron Devices, 5-1970, pp. 423–428.
Biazzo, M. R., "Fabrication of a Lithium Tantalate Temperature-Stabilized Optical Modulator", App. Optics, 5-1971, pp. 1016–1021.

Primary Examiner—William H. Punter
Attorney, Agent, or Firm—Spencer & Frank

[57] ABSTRACT

A crystal structure arrangement used in a spatial light modulator wherein an electrooptic crystal structure faces an electron beam source, such as a photocathode or an electron gun, within a vacuum envelope. Electrons emitted from the electron beam source in response to an image or image signal source are stored on the surface of the electrooptic crystal structure to form a charge image thereon and then to change the refractive index of the electrooptic crystal structure corresponding to the stored charge image. The refractive index change is read out using a laser beam or incandescent light beam.

18 Claims, 8 Drawing Sheets

SPATIAL LIGHT MODULATOR

BACKGROUND OF THE INVENTION

The present invention relates to a crystal structure arrangement consisting of electrooptic and compensation crystals for use in a spatial light modulator, wherein the electrooptic crystal faces an eletron beam source formed within an vacuum envelope, electrons emitted from the electron beam source are stored on the surface of the electrooptic crystal so that the refractive index of the electrooptic crystal is changed corresponding to a change in the stored charge, and the distribution of the refractive index change is read out by means of a laser beam or an incandescent light beam.

The principle of operation of the conventional spatial light modulator will now be described.

Figure 1:
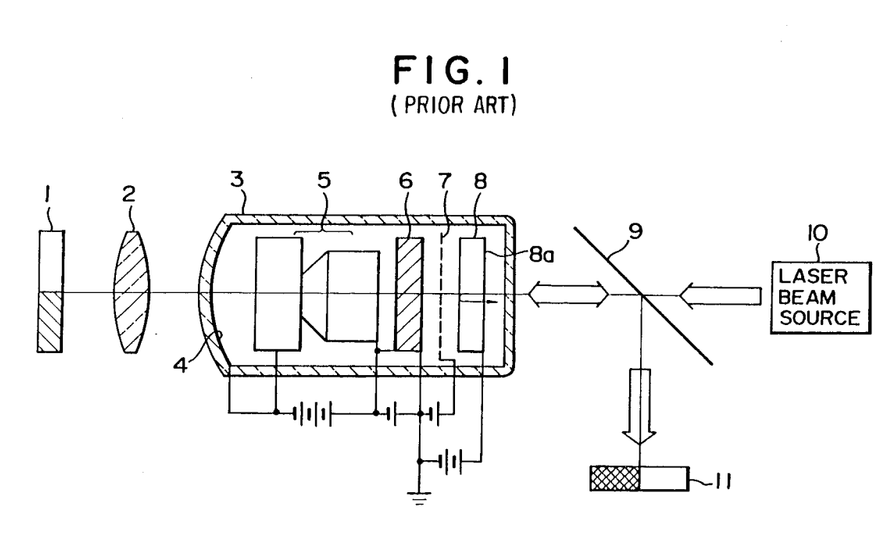
FIG. 1 shows the basic configuration of the conventional spatial light modulator.

FIG. 1 shows the basic configuration of a spatial light modulator in accordance with the conventional techniques. While being illuminated by incoherent light, an input pattern image 1 passes through lens 2 and then it is incident on photocathode 4 formed on the inside surface of glass envelope 3 of the spatial light modulator.

Responding to the input pattern image 1, photocathode 4 emits photoelectrons. The photoelectrons pass through electronic acceleration/focusing lens system 5 and then they are incident on a microchannel plate 6, which multiplies the electrons by a factor in the order of thousands.

The multiplied electrons pan through mesh electrode 7 and are stored on the surface of electrooptic crystal plate 8, i.e., $LiNbO_3$. Transparent conductive film electrode 8a is formed on the other surface of plate 8 to change the refractive index thereof corresponding to the electronic charge image thereon.

When a laser beam emitted from laser beam source 10 passes through half mirror 9 and is incident on electrooptic crystal plate 8, laser beam image 11 (a coherent image) is obtained. Laser beam image 11 can be used to perform optical parallel processing by utilizing the coherent light beam.

Figure 2A:
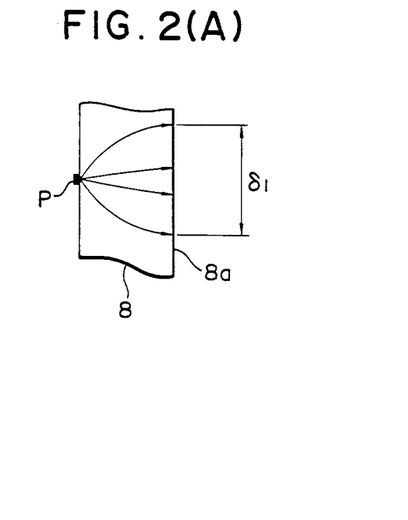
FIGS. 2(A) and 2(B) show the lines of electric force through the thickness of an electrooptic crystal plate.
Figure 2B:
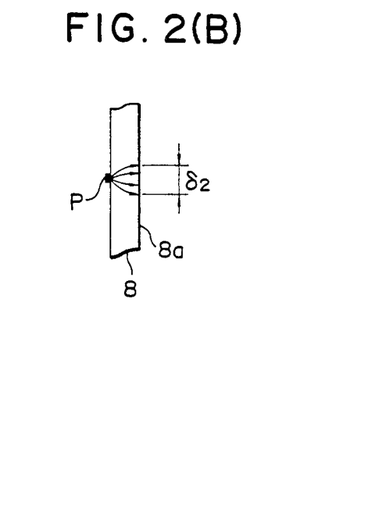

FIGS. 2(A) and 2(B) show the line of electric force along the thickness of an electrooptic crystal plate.

If electrooptic crystal plate 8 is rather thick, when a point charge P is formed on a surface of the electrooptic crystal plate in the spatial light modulator, the lines of electric force induced by the point charge spread out widely as indicated by $\delta_1$ in FIG. 2(A).

If electrooptic crystal plate 8 is rather thin, when point charge P is formed on a surface of the crystal in the spatial light modulator, the lines of electric field induced by the point charge spread out narrowly as indicated by $\delta_2$ in FIG. 2(B).

The lines of electric force formed along the thickness of the electrooptic crystal plate change the refractive index of electrooptic crystal plate 8 and the change of the refractive index can be used to modulate the light beams emitted from laser beam source 10. Thus, a coherent light image reflected from the surface of the electrooptic crystal plate has higher resolution for a thinner crystal structure.

Assume that electrooptic crystal plate 8 is sliced as thin as possible that it is a flatness of $\lambda/10$ its sides are parallel with a parrellelism of five seconds or better, and that the electrooptic crystal wafer is built into the spatial light modulator.

When an $LiNbO_3$ single crystal wafer cut at 55 degrees with respect to the optical axis had a diameter of 25 mm and a thickness of 0.3 mm, resolution of the spatial light modulator built in accordance with the conventional techniques was three line pairs per mm at a modulation factor of 50%.

The electrooptic crystal plate 8 used in the spatial light modulator in accordance with the conventional techniques can preferably be made of a crystalline material from which wafers with large areas can easily be produced, and it should hav a low half-wave voltage and an extremely low photoconductivity. It is preferably made of a material having optical properties which do not change after baking at high temperature during fabrication of the photocathode. Thus, an $LiNbO_3$ single crystal plate cut at 55 degrees with respect to the optical axis is generally used for fabricating the spatial light modulator.

Resolution of the spatial light modulator in accordance with the conventional techniques, however, is lower than that which can be used to peform the optical parallel processing by utilizing a coherent light beam, and the wafer of electrooptic crystal 8 should be made thinner to improve resolution of the spatial light modulator.

If the wafer of electrooptic crystal 8 is made thinner than the above, however it may be deformed to such an extent that said wafer cannot be used in the spatial light modulator.

As described above, the refractive index distribution in the electrooptic crystal structure can be changed in accordance with the stored charge image formed on the surface of an electrooptic crystal plate. When the light beam is incident on the electrooptic crystal plate after passing through a polarizer, the refractive index distribution can be read out by using the reflected light beam passing through an analyzer and then the image can be projected onto a projection screen. The electrooptic crystal plate can be made of KDP, BSO, BGO or $LiNbO_3$. $LiNbO_3$ is the most popular crystal among them. The electrooptic crystal plate is mounted on a support in a vacuum envelope wherein an electron beam source is formed.

KDP tends to be degraded during a temperature rise. It may be degraded during heat treatment for exhausting gases from the parts and envelope when the spatial light modulator is being fabricated.

BSO and BGO have photoconductivity which limits the allowable wavelength range.

An $LiNbO_3$ crystal has endurance against temperature rise and has no photoconductivity. An $LiNbO_3$ crystal cut at 55 degrees with respect to the optical axis has a half-wave voltage which is lower than that of an $LiNbO_3$ crystal cut at any other angle. Thus, an $LiNbO_3$ crystal cut at 55 degrees with respect to the optical axis is suitable for forming an electron charge image.

An $LiNbO_3$ crystal cut at 55 degrees with respect to the optical axis has a natural birefringent property which degrades resolution of images due to different wavelengths emitted from the incoherent light when it is illuminated by incoherent light.

An $LiNbO_3$ single crystal has an excellent electrooptic property. However, in the spatial light modulator in accordance with the conventional techniques, the incident light is separated into the ordinary (o) and the extraordinary (e) rays when passing thorugh the $LiNbO_3$ crystal because of a natural birefringent property therein, and these rays are modulated at different points within the LiNbO$_3$ crystal. Resolution cannot be improved by this type of spatial light modulator.

If the input pattern image is read out by utilizing a white light beam, the (o) and (e) rays caused by the natural birefringent property depend on the distributed wavelengths of the white light beam.

A single wavelength is required for a read operation and thus a white light beam cannot be used to improve resolution.

The refractive indices for the (o) and (e) rays may change in different ways when the ambient temperature changes. Thus, the light beam read out of LiNbO$_3$ crystal is modulated by temperature when the temperature changes.

If any compensation crystal is attached to the electrooptic crystal, the incident light may be reflected from the interface between the compensation and electrooptic crystals and thus resolution may be degraded.

SUMMARY OF THE INVENTION

The first objective of an the present invention is to provide a crystal structure arrangement of a plurality of crystals for use in a spatial light modulator wherein high resolution can be obtained by slicing the electrooptic crystal so that the refractive index can be changed with a stored charge, and by separating the light beam into the (o) and (e) rays within said electrooptic crystal in accordance with a specific relation held between the substrate crystal attached to said electrooptic crystal and another crystal.

The second objective of the present invention is to provide a crystal structure arrangement of a plurality of crystals for use in a spatial light modulator wherein the refractive index distribution within an electrooptic crystal has such a property that the refractive index can be changed with a stored charge and can be read out by any light beam, not just a laser beam.

The third objective of the present invention is to provide a crystal structure arrangement of a plurality of crystals for use in a spatial light modulator wherein the input pattern image on the electrooptic crystal surface can be read out by utilizing a white light beam, while problems caused by the natural birefrigence depending on wavelengths at the interface between the substrate crystal attached to the electrooptic crystal and another crystal have been solved.

The fourth objective of the present invention is to provide a crystal structure arrangement of a plurality of crystals for use in a spatial light modulator wherein problems caused by reflection of the incident light at said interface between two crystals have been solved.

In accordance with one aspect of the invention, a crystal structure arrangement in accordance with the above objectives includes an electron beam source formed within a vacuum envelope and an electrooptic crystal structure, wherein an optical property of the crystal structure changes in accordance with the electron charge image stored on the surface thereof when electrons emitted from the electron beam source are incident thereon. The electrooptic crystal structure consists of first and second electrooptic crystal plates, the first plate being thinner than the second plate, which are fastened together face to face by adhesive forming a transparent conductive film arranged between the first and second electrooptic crystal plates. The surface of the first electrooptic crystal plate faces the electron beam source and the surface of the second electrooptic crystal plate faces a third electrooptic crystal plate with a thickness the same as the second plate so that the index ellipsoids of the second and third plates are symmetrical with respect to the optical axis.

In accordance with another aspect of the invention, a crystal structure arrangement according to the above objectives include an electron gun formed within a vacuum envelope, an image signal source to generate an image signal, an electrooptic crystal structure having an optical property which changes in accordance with the electron charge image stored on the surface thereof when electrons emitted from the electron beam source are incident thereon, an incandescent light beam source by which changes of the optical property can be read out, and polarizing and analyzing means to linearly polarize the light beam. The electrooptic crystal structure consists of an electrooptic crystal plate and a compensation-use electrooptic crystal plate which has the same optical thickness as the electrooptic crystal plate and which is arranged in a crystal axis rotated by 90 degrees with respect to the optical axis thereof.

In accordance with another aspect of the invention, a crystal structure arrangement according to the above objectives include an electron gun formed within a vacuum envelope, an image signal source to generate an image signal, an electrooptic crystal structure having an optical property which changes in accordance with the electron charge image stored on the surface thereof when electrons emitted from the electron beam source are incident thereon, an incandescent light beam source by which changes of the optical property can be read out, and polarizing and analyzing means to linearly polarize the light beam and to limit the wavelengths of the light beam. The electrooptic crystal structure consists of an electrooptic crystal plate and a compensation-use electrooptic crystal plate with an optical thickness which can be adjusted by a DC bias voltage to be the case as that of the electrooptic crystal plate, where the compensation-use electrooptic crystal plate is arranged in a crystal axis rotated by 90 degrees with respect to the optical axis thereof so as to eliminate the effect of the natural birefringence on the electrooptic crystal plate while the electric field along the optical length is being applied to the compensation-use electrooptic crystal plate by the DC bias voltage.

In accordance with yet another aspect of the invention, a crystal structure arrangement according to the above objectives includes an electron beam source formed within a vacuum envelope, an electrooptic crystal structure having an optical property which changes in accordance with the electron charge image stored on the surface thereof when electrons emitted from the electron beam source are incident thereon, a light beam source by which changes of the optical property can be read out, and another compensation-use electrooptic crystal plate which is made of the same material as the electrooptic crystal structure, which has the same thickness as the electrooptic crystal structure, and which faces to the light beam source. A 90-degree polarization angle rotator element is further provided to rotate the angle of polarization by 90 degrees, the rotation element being arranged in a space between the electrooptic crystal structure and another compensation-use electrooptic crystal plate.

In accordance with a further aspect of the invention, a crystal structure arrangement according to the above objectives includes an electron beam source formed within a vacuum envelope, an electrooptic crystal structure having an optical property which changes in accordance with the electron charge image stored on the surface thereof when electrons emitted from the electron beam source are incident thereon, a light beam source by which changes of the optical property can be read out, and another compensation-use electrooptic crystal plate which is made of the same material as the electrooptic crystal structure, which has the same thickness as the electrooptic crystal structure, and which faces the light beam source. A 90-degree polarization angle rotator element rotates the angle of polarization at 90 degrees, the rotator element being arranged in a space between the electrooptic crystal structure and the another compensation-use electrooptic crystal plate. A voltage supply generates an electric field across the optical axis of the electrooptic crystal structure or the another compensation-use electrooptic crystal plate so that the optical length of the electrooptic crystal plate becomes equal to that of the another compensation-use electrooptic crystal plate.

In accordance with still a further aspect of the invention, a crystal structure arrangement according to the above objectives includes an electron beam source formed within a vacuum envelope, an electrooptic crystal structure having an optical property which changes in accordance with the electron charge image stored on the surface thereof when the electrons emitted from the electron beam source are incident thereon, a light beam source by which changes of the optical property can be read out, and another compensation-use electrooptic crystal plate which is arranged in a space between the electrooptic crystal structure and the light beam source. Anti-reflection coating films are formed along the optical path on a surface of the electrooptic crystal structure, which faces the light beam source, and on each surface of the compensation-use electrooptic crystal plate.

DESCRIPTION OF THE PREFERRED EMBODIMENTS

The preferred embodiments of the present invention will be described hereafter referring to the drawings.

Figure 3A:
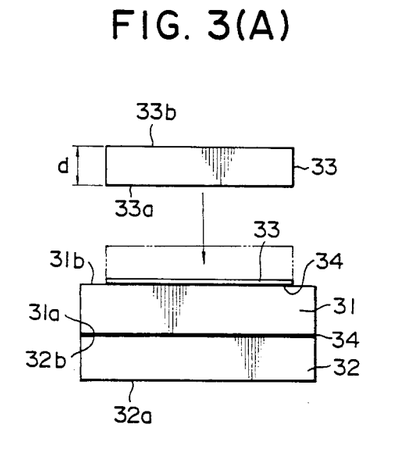
FIGS. 3(A) and 3(B) respectively show first and second embodiments of an electrooptic crystal structure arrangment for use in an spatial light modulator in accordance with the first objective of the present invention.
Figure 3B:
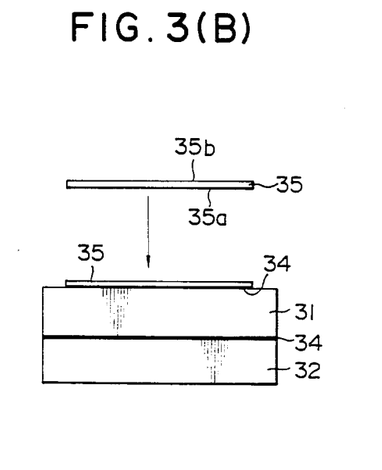

FIGS. 3(A) and 3(B) respectively show first and second embodiments of an electrooptic crystal structure for use in a spatial light modulator in accordance with the first objective of the present invention.

Referring first to FIG. 3(A), in the first embodiment of the electrooptic crystal structure in accordance with the first objective of the present invention a relatively thick single crystal plate 33 is fastened to crystal substrates 31 and 32, which are bound together face to face and then crystal plate 33 is sliced or polished to reduce its thickness and obtain a fine electrooptic crystal wafer. Each of crystal substrates 31 and 32 is made of an LiNbO3 crystal cut at 55 degrees with respect to the optical axis, and each substrate has a diameter of 25 mm and a thickness of 5 mm. Crystal substrate 31 is polished so that surface 31a thereof and surface 31b thereof are parallel to five seconds or less and are flat to within $\lambda/10$. Crystal substrate 32 is also polished so that surface 32a thereof and surface 32b thereof are parallel to five seconds or less and are flat to within $\lambda/10$. Thereafter, a transparent conductive film ITO is uniformly deposited onto the surface 31b of crystal substrate 31.

Single crystal plate 33 is made of an LiNbO3 crystal cut at 55 degrees with respect to the optical axis and it has a diameter of 20 mm and a thickness of 2 mm. Surface 33a of single crystal 33 is polished to obtain a flatness of $\lambda/10$.

Crystal substrates 31 and 32 are fastened face to face with transparent adhesive 34 so that the index ellipsoids for these substrates are symmetrical with respect to the surfaces on which adhesive 34 is coated. Transparent adhesive 34 may be epoxy resin or acrylic resin.

Surface 33a of single crystal plate 33 is fastened to the surface of crystal substrate 31 on which transparent conductive film ITO has been deposited. Surface 32a of crystal substrate 32 is set on an polishing mount, and then surface 33b of single crystal plate 33 is polished so that the thickness of single crystal plate 33 becomes 50 μm. Surface 33b of single crystal plate 33 is polished to obtain a flatness of $\lambda/10$. Surface 33a of crystal plate 33 is parallel to surface 33b thereof with a parallelism of at least five seconds.

The finished electrooptic crystal structure is then measured by using a flatness standard and automatic collimator so as to check whether the flatness and parallelism are as specified. A mirror 33c (see FIG. 5) made of a dielectric material is formed onto surface 33b of single crystal plate 33 and then it is installed as part of the spatial light modulator. Transparent conductive film ITO constitutes an electrode fabricated in the same manner as that of the conventional techniques.

Resolution of the spatial light modulator in accordance with the above specifications was 15 line pairs per mm at a modulation factor of 50%. Resolution was five times higher than that of the conventional techniques. The spatial light modulator can thus effectively be used for information processing which is carried out by using a coherent light beam.

The spatial light modulator is made by the exhausting process and also by the photocathode formation process, and it is held at an elevated temperature of 200° C. or more during baking. Cracking or peeling at the interface between two crystals cannot occur because of the same thermal expansion coefficient between these crystals since the electrooptic crystal structure is made with the same type of crystal material sandwiched by adhesive.

Any crystal with a natural birefringent property i.e., an LiNbO$_3$ single crystal plate cut at 55 degrees with respect to the optical axis, can be used to compensate for the phase change which can occur when no charge is stored on a surface of single crystal plate 33 if an appropriate voltage is applied to surface 31b thereof with respect to surface 32a thereof whereon a transparent conductive film has been deposited.

In the first embodiment of the spatial light modulator, crystal plate 33 is first fastened to the substrate by an adhesive agent and the polished to obtain a thin crystal structure. It can also be made in the same manner as the second embodiment which has been shown in FIG. 3(B).

In the second embodiment of the spatial light modulator shown in FIG. 3(B), an LiNbO$_3$ single crystal 35 which is cut at 55 degrees with respect to the optical axis which has a diameter of 20 mm and a thickness of 50 to 100 μm, is polished so that surface 35a faces surface 35b with a parallelism of at least five to six seconds and has a flatness of λ/10.

This thin crystal plate cannot directly be demounted from a polishing mount after it is polished, because it may be deformed. It can be fastened to single crystal plate 31, used as a substrate, with a parallelism of at least five to six seconds and a flatness of λ/10.

Thereafter, crystal substrates 31 and 32 are arranged so that the index ellipsoids thereof are symmetrical with respect to the respective optical axes.

Figure 4A:
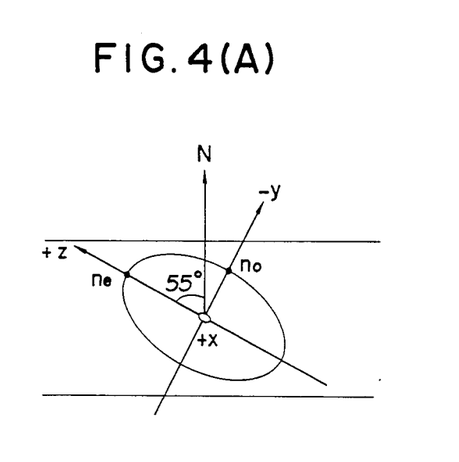
FIGS. 4(A) and 4(B) respectively show the index ellipsoid appearing in an LiNbO3 wafer cut at 55 degrees with respect to the optical axis, and separation of the incident light beam into the ordinary (o) and extraordinary (e) rays.
Figure 4B:
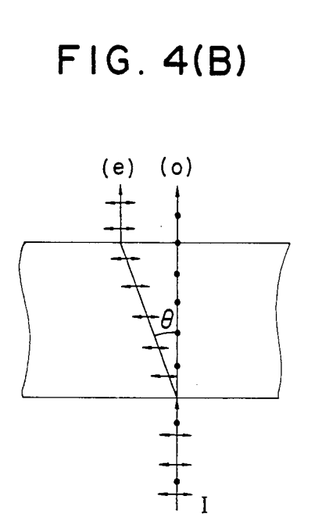

The index ellipsoid for an LiNbO$_3$ single crystal wafer cut in such a way that the normal to the surface thereof is located on the (−Y, Z) plane and makes an angle of 55 degrees with respect to the Z axis as shown in FIG. 4(A). If light beam I in FIG. 4(B) in incident on the wafer surface, the extraordinary ray goes in a direction which is at angle $\theta$ with respect to the normal to the wafer surface.

Figure 5:
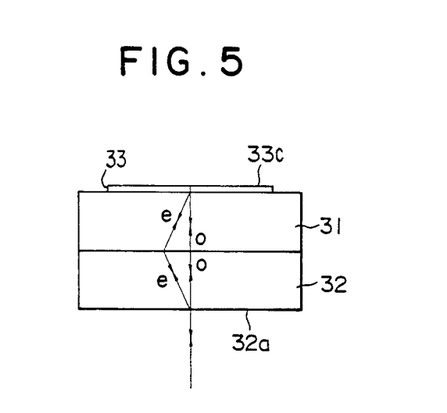
FIG. 5 shows the optical paths of the (o) and (e) rays thorugh the electrooptic crystal structure used in the spatial light modulator in accordance with a first objective of the present invention.

Angle $\theta$ is specified as $\theta = 2.2$ degrees for an LiNbO$_3$ single crystal cut at 55 degrees with respect to the optical axis. The extraordinary ray is 0.2 mm apart from the ordinary ray at the exit on a crystal substrate with a thickness of 5 mm. This implies that the ordinary and extraordinary rays are modulated at different points within a thin crystal substrate and thus high resolution cannot be expected. The crystal substrate is 300 μm thick in the conventional case, and an extraordinary ray which is 10 μm apart from the ordinary ray causes no problems. That is, when the index ellipsoids for crystal substrates 31 and 32 are symmetrical with respect to the respective optical axes as shown in FIG. 5, the ordinary and extraordinary rays reflected from mirror 33c can pass through the same exit point on surface 32a of crystal 33. A pair of electrooptic crystals may be bound together so that one crystal wafer is arrnaged in an opposite direction to the other by turning the latter crystal wafer by 180 degrees around the normal to the crystal wafer, or so that the +X axis of one crystal wafer is arranged at 180 degrees to that of the other. Although the index ellipsoids for a pair of crystal plates must be arranged symmetrically with respect to the respective optical axes, these crystal plates need not be fastened by adhesive.

As described above, the electrooptic properties of only the polished thin layer in the first and second embodiments shown in FIGS. 3(A) and 3(B), respectively, can be utilized to greatly improve resolution of the spatial light modulator.

The electrooptic crystal structure is fabricated by fastening a pair of crystals of the same material with an adhesive, and thus the problems arising from cracking, peeling and deformation of the crystal structure can also be solved. The defects caused by the natural birefringent property can also be eliminated.

The embodiments with respect to the second objective of the present invention will now be described referring to the related drawings.

Figure 6:
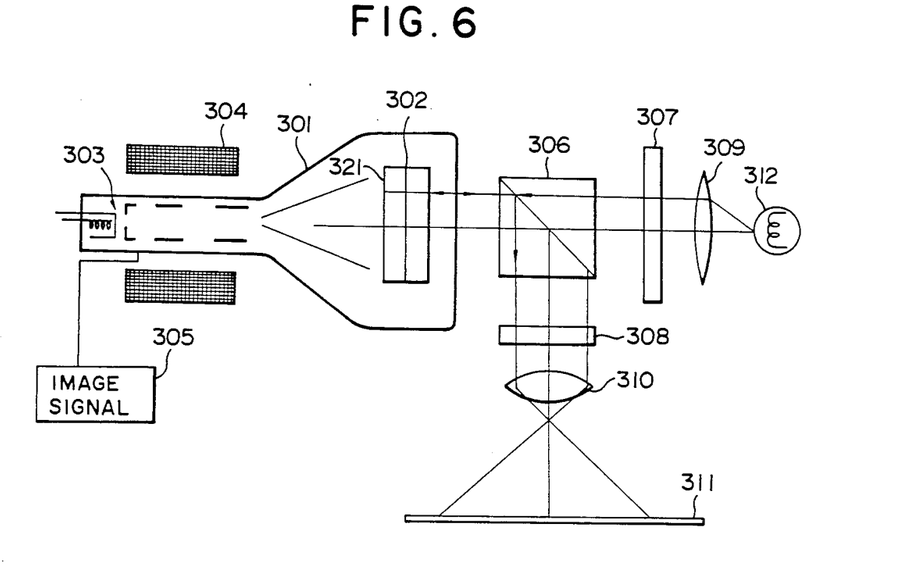
FIG. 6 shows an embodiment of a spatial light modulator in accordance with the second objective of the present invention.
Figure 7:
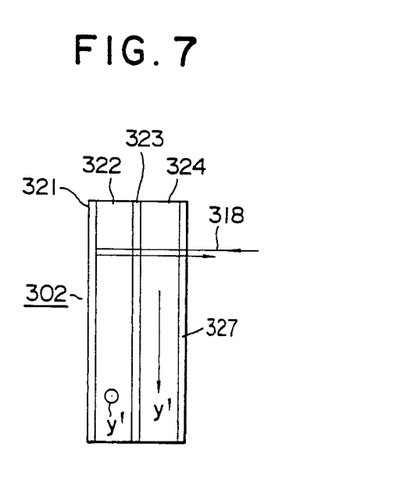
FIG. 7 shows a first embodiment of a crystal structure arrangement consisting of an electrooptic crystal plate used to form an electron charge image and an electrooptic crystal plate for compensation.

FIG. 6 shows a first embodiment of the spatial light modulator in accordance with the second objective of the present invention. FIG. 7 shows the first embodiment of a crystal structure arrangement composed of an electrooptic crystal plate used to form an electron charge image and an electrooptic crystal plate for compensation.

In FIGS. 6 and 7, envelope 301 contains electron gun 303 and optical assembly 302. Optical assembly 302 consists of electrooptic crystal plate 322 to form an electron image thereon and compensation crystal plate 324, as shown in FIG. 7. Each electrooptic crystal is made of LiNbO$_3$ cut at 55 degrees with respect to the optical axis. A mirror 321, made of a dielectric material with high resistivity, is formed on the front surface of the electrooptic crystal plate 322. Transparent conductive film 323 constituting an electrode is formed on the rear surface of the electrooptic crystal plate 322. Similarly, transparent conductive film 327 constituting an electrode is formed on plate 324.

Electron gun 303 is connected to image signal source 305, and electrons amplitude-modulated by the signal source 305 are deflected by the magnetic deflection field generated by deflecting coil 304. The deflected electrons go to mirror 321 of electrooptic crystal 322 used to form the electron image. A refractive index distribution forming an image appears on a surface of electrooptic crystal plate 322, and it corresponds to the distribution of the electron charges formed on the surface of electrooptic crystal plate 322 used to form the electron image.

The light beam coming from incoherent light source 312 is converted into a colluminated light beam by using collimating lens 9.

The collimated light beam passes through polarizer 307 and beam splitter 306 in sequence and is incident on compensation crystal plate 324 of optical assembly 302 which consists of an electrooptic crystal plate used to form an electron charge image, and a compensation crystal plate. The light beam reflected from mirror 321 passes through optical assembly 302 consisting of an electrooptic crystal plate used to form an electron charge image, and a compensation crystal plate. It then goes out of vacuum envelope 301. The light beam is reflected from beam splitter 306 and passes through analyzer 308 and projection lens 310. It then goes to projection screen 311 so as to obtain an enlarged image.

Figure 8:
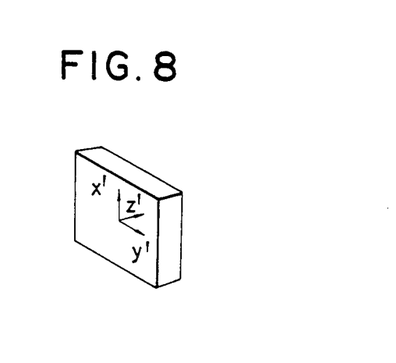
FIG. 8 shows a perspective view of an electrooptic crystal for explaining Pockel's effect.

Pockel's effect in an electrooptic crystal plate will be now described referring to FIG. 8.

The coordinates (X', Y', Z') in FIG. 8 do not define the optical axis of the crystal, but only a temporary relation at an arbitrary location within the crystal. The Z' coordinate is 55 degrees with respect to the optical axis of the crystal.

When an electric field is applied along the Z' coordinate, the refractive indices along the X' and Y' coordinates are changed by the electric field corresponding to the linearly polarized signal waves travelling along the Z' coordinate. It causes an elliptically polarized light signal to be generated.

When the elliptically polarized light signal is fed to analyzer 308, an intensity-modulated signal appears on projection screen 311.

In FIG. 7, the Y' coordinate of electrooptic crystal plate 322 used to form an electron charge image in optical assembly 302 is perpendicular to the plane of interest on the sheet of paper. The Y' coordinate of compensation crystal plate 324 is in parallel with the plane of interest on the sheet of paper, and it is rotated at 90 degrees with respect to the Y' coordinate of electrooptic crystal plate 322 used to form an electron charge image on the plane of interest.

The effect of natural birefringence on contrast limitation can be eliminated in the following manner.

Output light intensity I for an $LiNbO_3$ crystal with a natural birefringent property is given by expression (1).

$$I = I_o \sin^2 p \quad (1)$$

where, $p = (2\pi/\lambda)(Al + BV)$
I: Output light intensity
Io: Input light intensity
l: Crystal wafer thickness
V: Voltage across the crystal wafer
A and B: Constants
$\lambda$: Wavelength of the incident light.

$p$ depends on the wavelength and its variation measures $\pi$ for a wavelength width of 5 nm at $l = 300$ µm. It implies that a light beam with a wavelength of 5 nm or less is required for reading the electron charge image.

$(2\pi/\lambda)Al$ in expression (1) indicates natural birefringence, and it can be eliminated in accordance with the third objective of the present invention. When a crystal structure built in accordance with the second objective of the present invention is used, coherence limitation in reading the light beam can be eliminated to a great extent, and a light beam source consisting of a white light beam source and a bandpass filter can be used in place of the coherent beam source.

Transparent conductive film electrode 323 is deposited onto the first surface of electrooptic crystal plate 322 used to form an electron charge image, whereon the electron beam is incident, and compensation crystal plate 324 is fastened to electrooptic crystal plate 322 (which has the same thickness as compensation crystal plate 324) by using adhesive so that the opical axis of plate 322 is rotated by 90 degrees with respect to that of plate 324.

If no eletric field is applied to compensation crystal plate 324 when light beam 318 is incident on compensation crystal plate 324, the resulting phase angle $p$ is given by $$p = (2\pi/\lambda)(Al) \quad (2)$$

If a charge is formed on mirror 321 by the electron beam incident on electro-optical crystal 322 when an electric field is generated by the DC voltage applied to transparent conductive film 323 with respect to film 327 and when the optical axis of compensation crystal plate 324 is rotated by 90 degrees with respect to that of electrooptic crystal plate 322, the resulting phase angle $p$ is given by $$p = -(2\pi/\lambda)(Al + BV) \quad (3)$$

Phase change $\Delta p$ can thus be given by (3)-(2) as $$\Delta p = -(2\pi/\lambda)(BV) \quad (4)$$

Expression (4) does not include the natural birefringence term.

Figure 9:
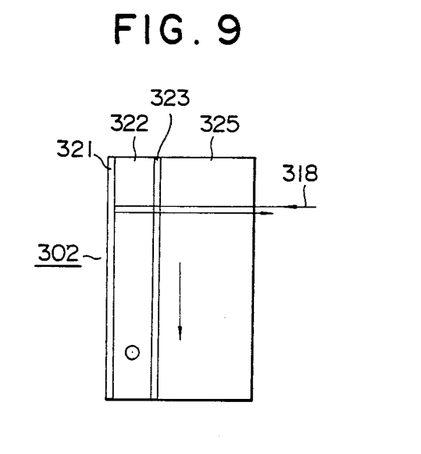
FIG. 9 shows a second embodiment of a crystal structure arrangement consisting of an electroopic crystal spatial plate used to form an electron charge image and an electrooptic crystal plate made with quartz crystal for compensation.

FIG. 9 shows a cross-sectionala view of a second embodiment of the crystal arrangement structure consisting of an electrooptic crystal plate used to form an electron charge image, and a compensation crystal plate made of quartz crystal with a positive natural birefringence coefficient.

The optical assembly shown in FIG. 9 consists of mirror 321, electrooptic crystal plate 322 used to form an electron charge image, transparent conductive film electrode 323, and compensation crystal plate 325 made of quartz crystal.

Negative natural birefringence coefficient A for $LiNbO_3$ is given by $A = -0.07$, where a quartz crystal has $A = 0.0091$.

If these two types of electrooptic crystal plates, i.e., $LiNbO_3$ and quartz, are used to compensate for both positive and negative A-values in natural birefringence, the resulting phase angle $p$ is given by $$p = (2\pi/\lambda)(-0.07 \, l_{1p} + 0.0091 \, l_2) \quad (5)$$

where $l_1$ and $l_2$ are the thicknesses of $LiNbO_3$ and quartz, respectively.

If $l_2$ is specified as 7.7 $l_1$, the effect of natural birefringence on phase angle $p$ can be eliminated.

The quartz crystal can thus be made thicker than the $LiNbO_3$ crystal plate which is used to form an electron charge image, and it facilitates work of the quartz crystal plate which is used to constitute a compensation crystal plate.

Figure 10:
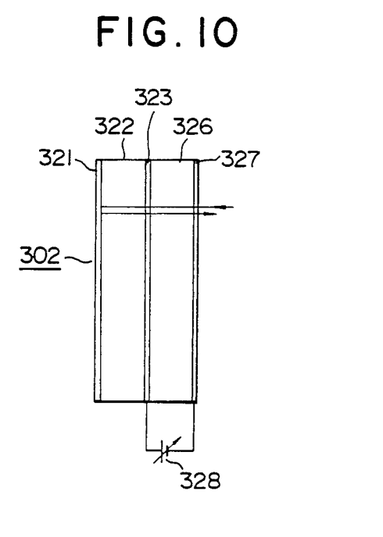
FIG. 10 shows a third embodiment of a crystal structure arrangement consisting of an electrooptic crystal plate used to form an electron charge image and an electrooptic crystal plate whereto a DC voltage is applied.

FIG. 10 shows a cross-sectional view of a third embodiment of the crystal structure arrangement, consisting of an electrooptic crystal plate used to form an electron charge image and a compensation crystal plate, with a DC voltage being applied so as to make the optical lengths equal to each other.

The principle of operation of the electrooptic crystal structure is the same as that of the electrooptic crystal structure shown in FIG. 7.

The electrooptic crystal structure consists of mirror 321, electrooptic crystal plate 322 used to form an electron charge image, transparent conductive film electrode 323, compensation crystal plate 326, and transparent conductive film electrode 327. A DC voltage applied to compensation crystal 326 is supplied from voltage source 328. A difference in thickness between electrooptic crystal plate 322 and compensation crystal plate 326 can be compensated by adjusting this DC voltage.

As described above, a compensation crystal plate is arranged to compensate for natural birefringence of the electrooptic crystal plate used to form an electron charge image so that the problems arising from natural birefringence of the electrooptic crystal plate, i.e., contrast limitation in the spatial light modulator, can be solved. Thus, an electronic image projector providing an excellent picture on the screen can be fabricated.

Figure 11:
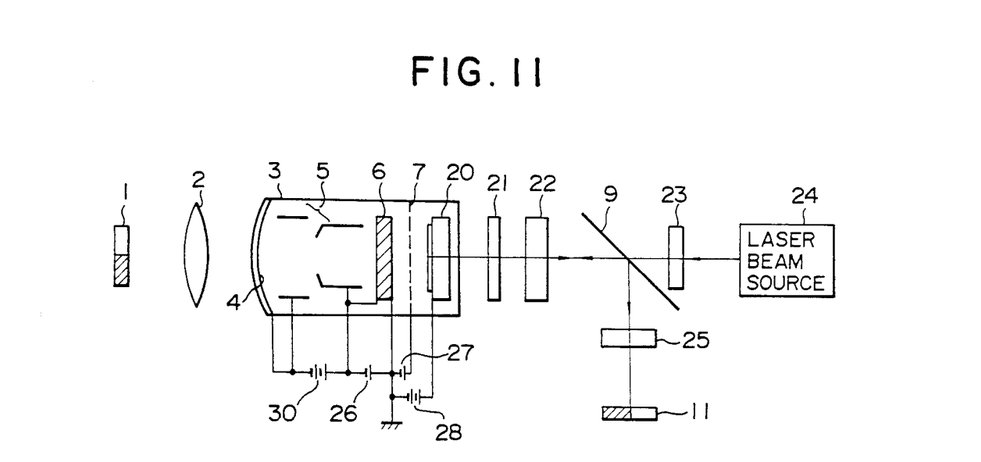
FIG. 11 shows a first embodiment of a spatial light modulator in accordance with the third objective of the present invention.

FIG. 11 shows a first embodiment of a spatial light modulator wherein an arrangement of the crystals in accordance with the third objective of the present invention is utilized.

Input pattern image 1 passes through lens 2 and then it is incident on the photocathode 4 of spatial light modulator 3.

Responding to the input pattern image 1, electrons emitted from the photocathode pass thorugh electronic acceleration/focusing lens system 5 and are incident on microchannel plate 6. The multiplied electrons strike the surface of electrooptic crystal structure 20 so that a charge image is formed on the surface of electro-optical crystal structure 20 responding to input pattern image 1.

Figure 12:
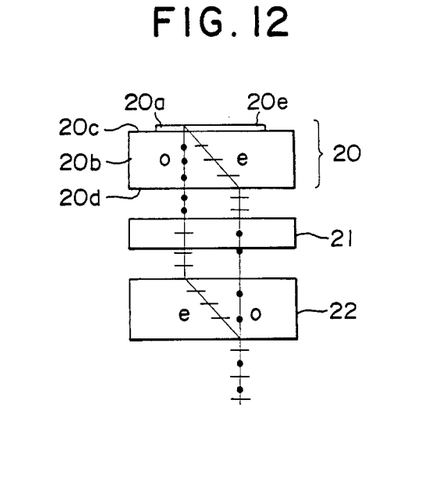
FIG. 12 shows the optical paths of the (o) and (e) rays of the electrooptic crystal structure in accordance with the third objective of the present invention.

In FIG. 12, a pair of LiNbO$_3$ crystal plates 20a and 20b are cut at 55 degrees with respect to the optical axis and are fastened together through transparent conductive film 20c by means of transparent acrylic resin so that the Z axes fo the crystals go in the same direction.

Crystal plate 20b has a thickness of 5 mm and crystal plate 20a has a thickness of 0.05 mm. Charges are stored on surface 20e of crystal plate 20a and the charge storage surface 20e is coated with dielectric material forming a mirror.

The refractive index of crystal plate 20a is changed by the charge stored on surface 20e of crystal plate 20a, and thus the refractive index change can cause a light beam to be modulated.

Surface 20e of crystal plate 20a can store changes until the potential at surface 20e thereof becomes equal to that at mesh electrode 7.

Microchannel plate power supply 26, mesh electrode power supply 27, crystal plate back-surface voltage supply 28, and photocathode and acceleration/focusing electrode power supply 30 are connected to the corresponding portions of spatial light modulator 3.

Half-wave plate 21, made of quartz crystal, is used to rotate by 90 degrees the plane of polarization of the light beam which passes through the half-wave plate 21.

Compensation crystal plate 22 is made by using an LiNbO$_3$ crystal plate cut at 55 degrees with respect to the optical axis.

Compensation crystal plate 22 has an optical crystal axis which is arranged in parallel with that of electrooptic crystal structure 20. Compensation crystal plate 22 has a thickness of 5.05 mm, which is the same as the sum of the thicknesses of crystal plates 20a and 20b used in the electrooptic crystal structure.

FIG. 12 shows the arrangement of electrooptic crystal structure 20, half-wave plate 21 and compensation crystal plate 22.

The light beam emitted from laser beam source 24, which is used for reading information out of the electrooptic crystal structure 20, is linearly polarized by polarizer 23 and then it is incident on electrooptic crystal structure 20 in spatial light modulator 3 after passing through half mirror 9, compensation crystal 22 and half-wave plate 21.

The light beam reflected from electrooptic crystal structure 20 passes through half-wave plate 21 and compensation crystal plate 22, and then it is reflected from half mirror 9. The light beam reflected from half mirror 9 passes through analyzer 25 and then output image 11 is formed.

The light beam incident on compensation crystal plate 22, which is made of LiNbO$_3$ cut at 55 degrees with respect to the optical axis, is separated into the (o) and (e) rays within crystal plate 22 as shown in FIG. 12. The plane of polarization of the (o) and (e) rays coming from compensation crystal plate 22 rotates by 90 degrees when these (o) and (e) rays pass through half-wave plate 21, and then the rotated (o) and (e) rays are incident on electrooptic crystal structure 20 of spatial light modulator 3. Thus, the (o) and (e) rays are transmitted in a reverse process. These rays arrive at a point on the surface of crystal plate 20a which is used for modulation, as shown in FIG. 12.

Both half-wave plate 21 and compensation crystal plate 22 can also be built into spatial light modulator envelope 3.

Figure 13:
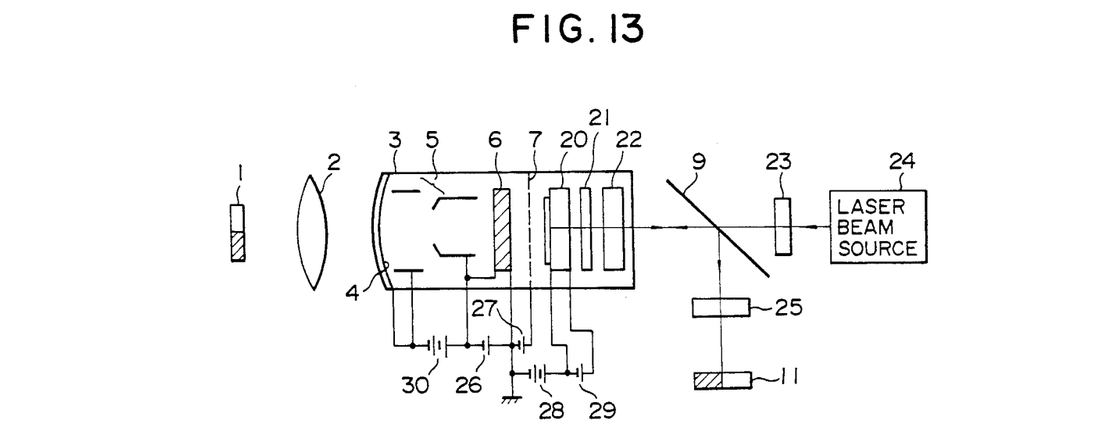
FIG. 13 shows a second embodiment of a spatial light modulator in accordance with the third objective of the present invention.

FIG. 13 shows a second embodiment of a spatial light modulator built in accordance with the third objective of the present invention.

In FIG. 13, half-wave plate 21 and compensation crystal plate 22 are built into spatial light modulator envelope 3. Locations of optical parts are the same as those in FIG. 11.

A transparent conductive film is deposited onto surface 20d of electrooptic crystal structure 20 in FIG. 12 and a DC biasing voltage is fed from power supply 29 to surface 20c thereof with respect to surface 20d thereof so that the refractive index of electrooptic crystal structure 20 may be adjusted. The initial phase difference between the (o) and (e) rays can be compensated by adjusting the voltage across compensation crystal plate 22. The other parts are the same as those in FIGS. 11 and 12.

The embodiment provides a resolution of 15 line pairs per mm at a modulation factor of 50%, eliminating resolution degradation due to the separated (o) and (e) rays.

The white light beam emitted from a halide lamp is fed through an optical filter with a wavelength width of 10 nm to the vacuum envelope so as to obtain high resolution.

The output light beam strength can also be stabilized against room temperature changes. The photocathode can be replaced by electron gun, and the crystal plate used as a half-wave plate can be replaced by Fresnel Rhombs prism. In addition, a pair of electrooptic crystal plates fastened together face to face can be replaced by a single electrooptic crystal plate.

As described above, the (o) and (e) rays separated by using an electrooptic crystal with a natural birefringent property can travel along the same optical path length. Problems arising from natural birefringence can be solved by the above method.

Figure 14:
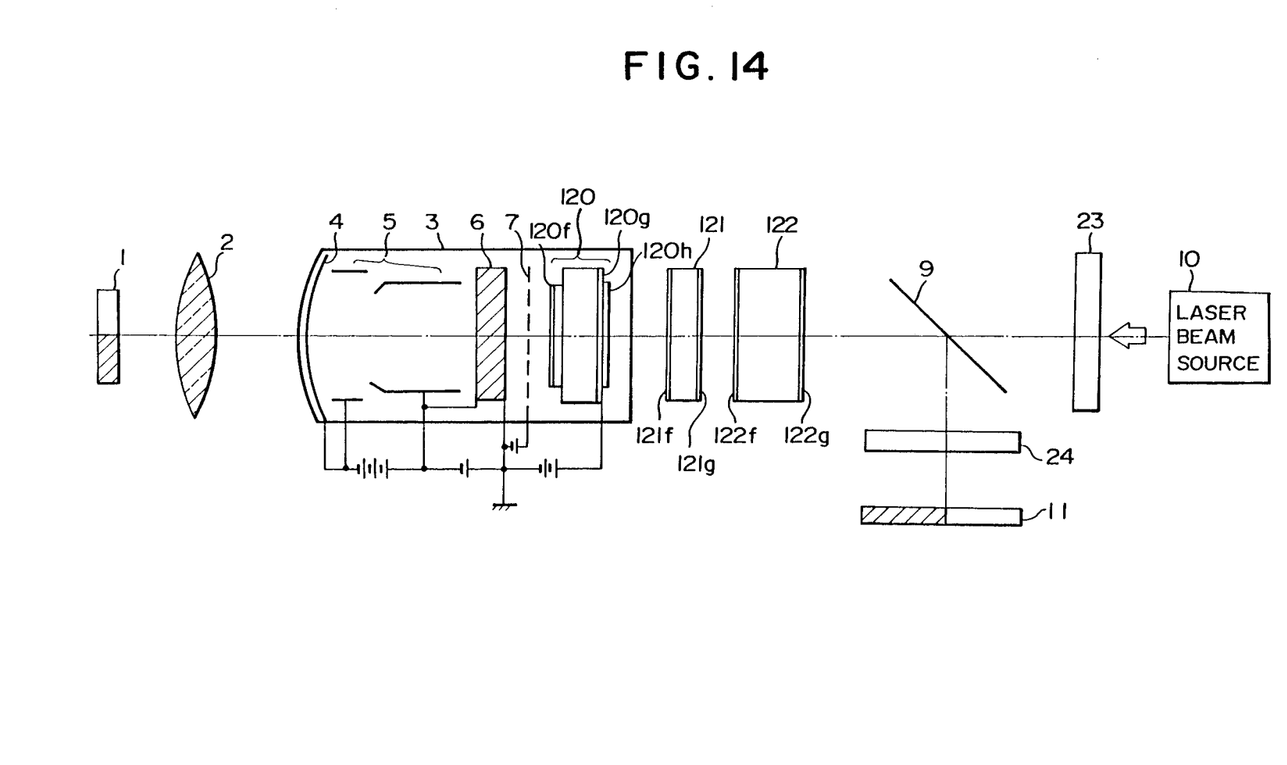
FIG. 14 shows a first embodiment of a spatial light modulator in accordance with the fourth objective of the present invention.

FIG. 14 shows a first embodiment of a spatial light modulator built in accordance with the fourth objective of the present invention.

A mirror 120f, made with $SiO_2$-$ZrO_2$ multilayer films, is formed on the first surface, which faces the photocathode, in electrooptic crystal structure 120. Structure 120 consists of $LiNbO_3$ crystal plates cut at 55 degrees with respect to the optical axis.

Transparent conductive film 120g, made of $In_{1-x}Sn_xO_3$, is used to constitute an electrode and is formed on the second surface of electrooptic crystal structure 120.

An $SiO_2$ layer 120h with a thickness of $\lambda/4n$ is deposited onto electrooptic crystal structure 120 by the sputtering method while the electrodes are arranged on four sides of transparent conductive film 120g. The turn n in $\lambda/4n$ indicates the refractive index of $SiO_2$, and $\lambda$ indicates the band center wavelength for the read-out light beam.

$SiO_2$ layers 122f and 122g, each having a thickness of $\lambda/4n$, are deposited onto the respective surfaces of compensation crystal plate 122 made of $LiNbO_3$ cut at 55 degrees with respect to the optical axis. $SiO_2$ layers 120h, 122f and 122g constitute anti-reflection coating layers. $MgF_2$ films 121f and 121g, each having a thickness of $\lambda/4n'$, are deposited onto the sides of half-wave crystal plate 121. The term n' in $\lambda/4n'$ indicates the refractive index of $MgF_2$.

$MgF_2$ films 121f and 121g constitute anti-reflection coating layers. Crystal structures with anti-reflection coatings 122f and 121g on compensation crystal plate 122 in FIG. 14 have a transmittivity of 99% for an He-Ne laser beam, while the transmittivity is of 75% if no coating is deposited onto compensation crystal plate 122.

Figure 15:
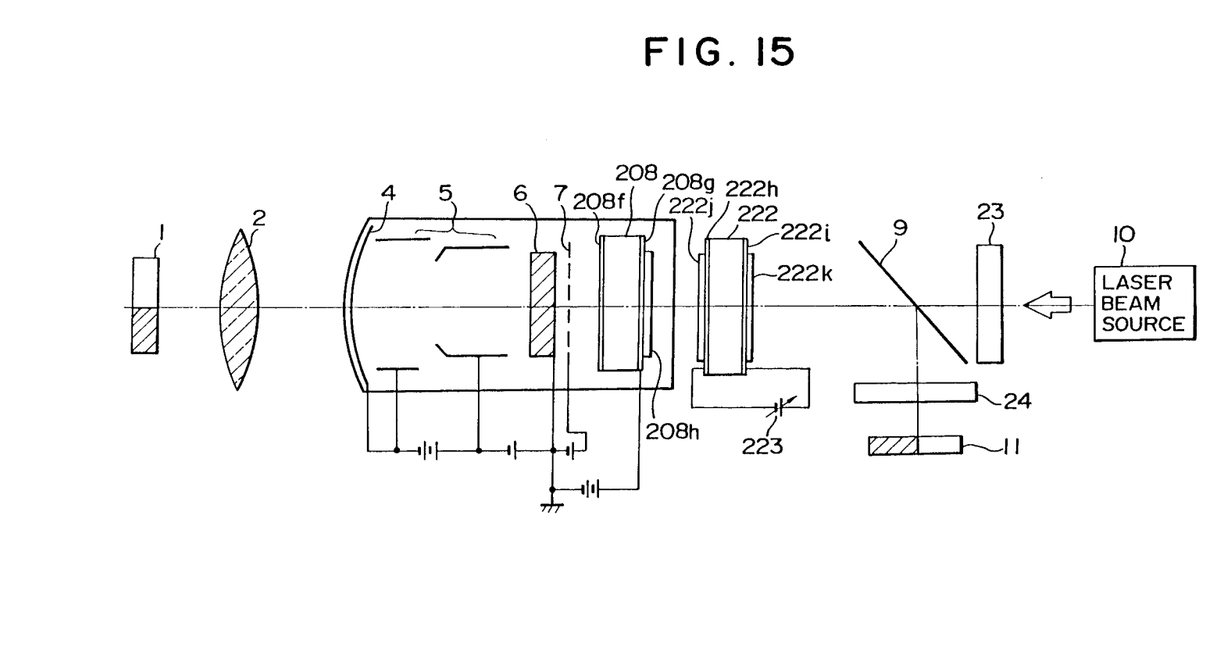
FIG. 15 shows a second embodiment of a spatial light modulator in accordance with the fourth objective of the present invention.

FIG. 15 shows a second embodiment of a spatial light modulator built in accordance with the fourth objective of the present invention.

Mirror 208f made with $SiO_2$-$ZrO_2$ multiple layers, is formed on the first surface, which faces the photocathode, of electrooptic crystal structure 208. Structure 208 is made of $LiNbO_3$ crystal plate cut at 55 degrees with respect to the optical axis.

Transparent conductive films 208g of $In_{1-x}Sn_xO_3$ are formed on the second surface of electrooptic structure 208 to constitute an electrode.

$SiO_2$ layer 208h, with a thickness of $\lambda/4n$ is, deposited onto electrooptic crystal structure 208 by the sputtering method while the electrodes are arranged on four sides of transparent conductive film 208g, and it is used as a anti-reflection coating layer. The term n in $\lambda/4n$ indicates the refractive index of $SiO_2$, and $\lambda$ indicates the band center wavelength for the read-out light beam.

Transparent conductive films 222h and 222i which are made of $In_{1-x}Sn_xO_3$ and used to constitute the electrodes, are formed on both surfaces of compensation crystal plate 222.

$SiO_2$ layers 222j and 222k, each having a thickness of $\lambda/4n$, are deposted onto electrooptic crystal structure 222 by the sputtering method while the electrodes are arranged on the respective four sides of transparent conductive films 222h and 222i. These films act as multi-reflection coatings. Voltage supply 223 can be used to compensate for the initial phase.

In the embodiments of the spatial light modulator in accordance with the fourth objective of the present invention, a single layer is used as a anti-reflection coating layer. However, it can be replaced by a multiple layer structure consisting of $SiO_2$ and $TaO_5$. The multiple layer structure has a anti-reflection property over a wide range of wavelengths.

As described in the above embodiments, anti-reflection coatings are deposited onto the surface which faces the read-out light beam source for reading out information from the electrooptic crystal structure, and onto the surface which passes the light beam to be incident on the compensation crystal plate. All the light beam energy can pass through the compensation crystal plate, and noises can be eliminated because of their randomness. Thus, a high S/N ratio and high contrast can be obtained while the effect of natural birefringence on contrast limitationn can be eliminated.

What is claimed is:

1. A crystal structure arrangement for use in a spatial light modulator which includes an electron beam source formed within a vacuum envelope, comprising:
    an electrooptic crystal structure having an optical property that changes in accordance with the electron charge image stored on the surface thereof when electrons emitted from the electron beam source are incident thereon, wherein said electrooptic crystal structure includes a first electrooptic crystal plate, a second electrooptical crystal plate that is thicker than the first plate, adhesive which fastens the first and second plates together face to face and which forms a transparent film arranged between the first and second plates, the first plate having a surface which faces the electron beam source, and a third electrooptic crystal plate which faces the second plate and which has a thickness the same as the second plate, the second and third plates having index ellipsoids which are symmetrical with respect to the optical axis.

2. A crystal structure arrangement for use in a spatial light modulator as claimed in claim 1, wherein said second and third electrooptic crystal plates are fastened together face to face by adhesive.

3. A crystal structure arrangement for use in a spatial light modulator as claimed in claim 2, wherein said first electrooptic crystal plate is provided by polishing a thicker electrooptic crystal plate that is fastened to said second electrooptic crystal plate.

4. A crystal structure arrangement for use in a spatial light modulator as claimed in claim 1, wherein said first electrooptic crystal plate is provided by polishing a thicker electrooptic crystal plate while the adhesive fastens said thicker plate to saif first plate.

5. A crystal structure arrangement for use in a spatial light modulator which includes an electron source formed within a vacuum envelope, an image signal source to generate an image signal, an incandescent light beam source to provide a wide-band light beam, and polarizing and analyzing means to linearly polarize said light beam, said crystal structure arrangement comprising:
    an electrooptic crystal structure having an optical property which changes in accordance with the electron charge image stored on the surface thereof when electrons emitted from the electron source are incident thereon, changes of the optical property being read out by the light beam, said electrooptic crystal structure additionally having a face and natural birefrigence with respect to the light beam which is perpendicular to the face, wherein said electrooptic crystal structure includes an electrooptic crystal plate and a compensation-use electrooptic crystal plate which has the same optical thickness as said electrooptic crystal plate and which is arranged with a crystal axis rotated by 90 degrees with respect to the optical axis thereof.

6. A crystal structure arrangement for use in a spatial light modulator as claimed in claim 5, wherein said compensation-use electrooptic crystal plate is made of the same material as said electrooptic crystal plate.

7. A crystal structure arrangement for use in a spatial light modulator as claimed in claim 5, wherein said compensation-use electrooptic crystal plate is made of quartz crystal.

8. A crystal structure arrangement for use in a spatial light modulator which includes an electron source formed within a vacuum envelope, an image signal source to generate an image signal, an incandescent light beam source, and polarizing and analyzing means to linearly polarize the light beam and to limit the wavelengths of the light beam, said crystal structure arrangement comprising:

an electrooptic crystal structure having an optical property which changes in accordance with the electron charge image stored on the surface thereof when electrons emitted from the electron source are incident thereof, the change of the optical property being read out by the light beam, wherein said electrooptic crystal structure includes an electrooptic crystal plate and a compensation-use electrooptic crystal plate with an optical thickness which can be adjusted by a DC bias voltage to be the same as that of said electrooptic crystal plate, where said compensation-use electrooptic crystal plate is arranged with a crystal axis rotated by 90 degrees with respect to the optical axis thereof so as to eliminate the effect of the natural birefringence on said electrooptic crystal plate while the electric field along said optical thickness is being applied to said compensation-use eletrooptic crystal plate by said DC bias voltage.

9. A crystal structure arrangement for use in a spatial light modulator which includes an electron beam source formed within a vacuum envelope and a light beam source to provide a wide-band light beam, said crystal structure arrangement comprising:

an electrooptic crystal structure having an optical property which changes in accordance with the electron charge image stored on the surface thereon when electrons emitted from said electron beam source are incident thereon, changes of said optical property being read out by the light beam, said electrooptic crystal structure additionally having a face and natural birefringence with respect to the light beam which is perpendicular to the face; a compensation-use electrooptic crystal plate which is made of the same material as said electrooptic crystal structure, which has the same thickness as said electrooptic crystal structure, and which faces said light beam source; and a 90-degree polarization angle rotator element to rotate the angle of polarization by 90 degrees, said rotator element being arranged in a space between said electrooptic crystal structure and said compensation-use electrooptic crystal plate.

10. A crystal structure arrangement for use in a spatial ligt modulator as claimed in claim 9, wherein said 90-degree polarization angle rotator element is a half-wave plate or a Fresnel Rhombs prism.

11. A crystal structure arrangement for use in a spatial light modulator as claimed in claim 9, wherein said 90-degree polarization angle rotator element and said compensation-use electrooptic crystal plate are arranged outside said vacuum envelope.

12. A crystal structure arrangement for use in a spatial light modulator as claimed in claim 9, wherein said 90-degree polarization angle rotator element and said compensation-use electrooptic crystal plate are arranged within said vacuum envelope.

13. A crystal structure arrangement for use in a spatial light modulator as claimed in claim 9, wherein said electrooptic crystal structure comprises a thin electrooptic crystal plate having a rear surface, a thicker electrooptic crystal plate, and a transparent conductive film which fastens said thicker plate to said rear face of said then plate and which constitutes an electrode.

14. A crystal structure arrangement or use in a spatial light modulator as claimed in claim 13, wherein said compensation-use electrooptic crystal plate has a thickness which is given by the sum of the thickness of said thin electrooptic crystal plate and that of said thicker electrooptic crystal plate.

15. A crystal structure arrangement for use in a spatial light modulator which includes an electron beam source formed within a vacuum envelope and a light beam source, said crystal structure arrangement comprising:

an electrooptic crystal structure having an optical property which changes in accordance with the electron charge image stored on the surface thereof when electrons emitted from said electron beam source are incident thereon, changes of said optical property being read out by the light beam; a compensation-use electrooptic crystal plate which is made of the same material as said electrooptic crystal structure, which has the same thickness as said electrooptic crystal structure, and which faces said light beam source; a 90-degree polarization angle rotator element to rotate the angle of polarization by 90 degrees, said rotator element being arranged in a space between said electrooptic crystal structure and said compensation-use electrooptic crystal plate; and voltage supply means for generating an electric field across the optical axis of at least one of said electrooptic crystal structure and said compensation-use electrooptic crystal plate so that the optical length of said electrooptic crystal plate becomes equal to that of said compensation-use electrooptic crystal plate.

16. A crystal structure arrangement for use in a spatial light modulator which includes an electron beam source formed within a vacuum envelope and a light beam source, said crystal structure arrangement comprising:

an electrooptic crystal structure having an optical property which changes in accordance with the electron charge image stored on the surface thereof when electrons emitted from said electron beam source are incident thereon, changes of said optical property being read out by said light beam; a compensation-use electrooptic crystal plate which is arranged in a space between said electrooptic crystal structure and said light beam source; and anti-reflection coating films formed along the optical path on a surface of said electrooptic crystal structure, which faces said light beam source, and on each surface of said compensation-use electrooptic crystal plate.

17. A crystal structure arrangement for use in a spatial light modulator as claimed in claim 5, wherein said electrooptic crystal plate is made of an LiNbO$_3$ crystal cut at 55 degrees with respect to the optical axis of the LiNbO$_3$ crystal.

18. A crystal structure arrangement for use in a spatial light modulator as claimed in claim 9, wherein said electrooptic crystal structure comprises a plate made of LiNbO$_3$ crystal cut at 55 degrees with respect to the optical axis of the LiNbO$_3$ crystal.

* * * * *